United States Patent
Roper et al.

(10) Patent No.: US 11,224,944 B1
(45) Date of Patent: Jan. 18, 2022

(54) APPARATUS AND METHOD FOR IN-SITU LASER PEENING DURING ADDITIVE MANUFACTURING

(71) Applicant: HRL LABORATORIES, LLC, Malibu, CA (US)

(72) Inventors: Christopher S. Roper, Oak Park, CA (US); John H. Martin, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 93 days.

(21) Appl. No.: 16/374,247

(22) Filed: Apr. 3, 2019

Related U.S. Application Data

(60) Provisional application No. 62/663,670, filed on Apr. 27, 2018.

(51) Int. Cl.
| | |
|---|---|
| *B22F 3/105* | (2006.01) |
| *B23K 26/342* | (2014.01) |
| *B23K 26/00* | (2014.01) |
| *B24C 1/00* | (2006.01) |
| *B23K 26/08* | (2014.01) |
| *B33Y 80/00* | (2015.01) |
| *B21D 26/06* | (2006.01) |
| *B33Y 10/00* | (2015.01) |
| *B33Y 40/00* | (2020.01) |
| *B23K 26/14* | (2014.01) |
| *B22F 10/60* | (2021.01) |

(52) U.S. Cl.
CPC ............ *B23K 26/342* (2015.10); *B21D 26/06* (2013.01); *B22F 10/60* (2021.01); *B23K 26/0093* (2013.01); *B23K 26/0884* (2013.01); *B23K 26/1464* (2013.01); *B24C 1/003* (2013.01); *B33Y 10/00* (2014.12); *B33Y 40/00* (2014.12); *B33Y 80/00* (2014.12)

(58) Field of Classification Search
CPC ........ B22F 3/1055; B22F 10/60; B22F 10/10; B22F 10/20
See application file for complete search history.

(56) References Cited

U.S. PATENT DOCUMENTS

| | | | |
|---|---|---|---|
| 2015/0266285 A1* | 9/2015 | James | B33Y 40/00 419/28 |
| 2017/0087670 A1 | 3/2017 | Kalentics et al. | |
| 2018/0311757 A1* | 11/2018 | Bucknell | B33Y 10/00 |

OTHER PUBLICATIONS

Gujba et al., "Laser Peening Process and Its Impact on Materials Properties in Comparison with Shot Peening and Ultrasonic Impact Peening," Materials, 7, 7925-7974, 2014.

* cited by examiner

*Primary Examiner* — Christopher S Kessler
(74) *Attorney, Agent, or Firm* — Lewis Roca Rothgerber Christie, LLP (57) ABSTRACT

A method of manufacturing a part includes additively manufacturing, with an additive manufacturing machine, at least one wall of the part having a first thickness from powder in a powder bed, and peening, with a peening system, at least a portion of the wall of the part. The peening induces plastic deformation in the portion of the wall. The portion of the wall that is peened has a second thickness less than the first thickness of the wall prior to peening. The second thickness of the portion of the wall may be less than a minimum thickness limit achievable by the additive manufacturing machine.

8 Claims, 4 Drawing Sheets

APPARATUS AND METHOD FOR IN-SITU LASER PEENING DURING ADDITIVE MANUFACTURING

CROSS-REFERENCE TO RELATED APPLICATION(S)

The present application claims priority to and the benefit of U.S. Provisional Application No. 62/663,670, filed Apr. 27, 2018, the entire content of which is incorporated herein by reference.

BACKGROUND

1. Field

The present disclosure relates generally to additive manufacturing apparatuses and processes.

2. Description of Related Art

A variety of additive manufacturing techniques exist to manufacture components, such as selective laser sintering, laser melting, scanned laser fusion and sintering, electron beam melting, selecting inkjet binding, and fused deposition modeling. Additionally, additively manufactured components are commonly post-processed to control the surface finish of the completed component. Related art post-processing techniques include electropolishing and sand blasting. However, these related art post-processing techniques require line of sight access. Accordingly, the requirement for line of sight access limits the potential for these post-processing techniques, particularly for additively manufactured components with complex geometries.

SUMMARY

The present disclosure is directed to various embodiments of a method of manufacturing a part. In one embodiment, the method includes additively manufacturing, with an additive manufacturing machine, at least one wall of the part from powder in a powder bed. The wall has a first thickness. The method also includes peening, with a peening system, at least a portion of the wall of the part. The peening induces plastic deformation in the at least the portion of the wall. The laser peening induces plastic deformation in the at least one region. The portion of the wall has a second thickness less than the first thickness following the peening.

The additively manufacturing and the peening may be alternately and repeatedly performed.

The second thickness of the at least a portion of the wall may be less than a minimum thickness limit achievable by the additive manufacturing machine.

The at least one wall of the part may include a base wall, an upper wall at least partially supported on an unsintered portion of the powder, and at least one sidewall extending from the base wall to the upper wall.

The peening, with the peening system, at least a portion of the wall may include peening, with the peening system, at least a portion of the upper wall.

The peening may include laser peening, with a laser impulse system, the at least a portion of the wall.

The laser impulse system may include a femtosecond pulsed laser or a nanosecond pulsed laser.

The laser peening may include directing a laser beam through a confining medium between the at least a portion of the wall and the laser impulse system, and the confining medium may be at least partially transparent to a wavelength of the laser beam.

The confining medium may be a vapor deposited solid coating, a liquid, an additively manufactured thin layer, or a combination thereof.

The additively manufactured thin layer may include a same material as the part or a different material than the part.

The laser peening may be performed without directing a laser beam through a confining medium between the at least one portion of the wall and the laser impulse system.

The method may also include annealing the part.

The peening may include shot peening at least a portion of the wall with shot from a shot peening system.

The shot may be configured to sublime at a temperature and a pressure inside the additive manufacturing machine.

The shot may include $CO_2$ particles.

The shot may include ferromagnetic metallic particles.

The powder may include metal or a metal composite.

The present disclosure is also directed to various embodiments of a three-dimensional additively manufactured part. The three-dimensional additively manufactured part includes at least wall having a first thickness, and a peened region of the at least one wall. The peened region of the at least one wall has a second thickness less than the first thickness. The second thickness of the peened region is less than a minimum thickness limit achievable by an additive manufacturing machine utilized to form the at least one wall.

The peened region of the at least one wall may be porous-free.

The at least one wall may include a series of fins of a heat exchanger.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of additively manufacturing a part (e.g., a metal or metal alloy part). In one or more embodiments, the method includes peening (e.g., laser peening or shot peening) the part during the additive manufacturing process. Unlike related art processes in which only exterior surfaces of the finished part are post-processed following the additive manufacturing process, peening the part during the additive manufacturing process enables controlling the surface finish, hardness, and/or residual stress throughout the part, including on interior surfaces of the part that would be difficult or impossible to access after the part is finished (e.g., peening the part during the additive manufacturing process enables controlling the surface finish, hardness, and/or residual stress of portions of the part for which no line of sight access exists following completion of the part). Controlling the surface finish, hardness, and/or residual stress of the part is configured to mitigate the potential for crack development in the part and thereby improve the fatigue life and stress corrosion resistance of the part.

Additionally, the method according to one or more embodiments of the present disclosure is configured to manufacture a part or a portion thereof having a thickness below the resolution of an additive manufacturing process, such as a thin, pinhole-free wall (e.g., a thin, non-porous wall) having a thickness below the minimum limit of the additive manufacturing machine.

Figure 1A:
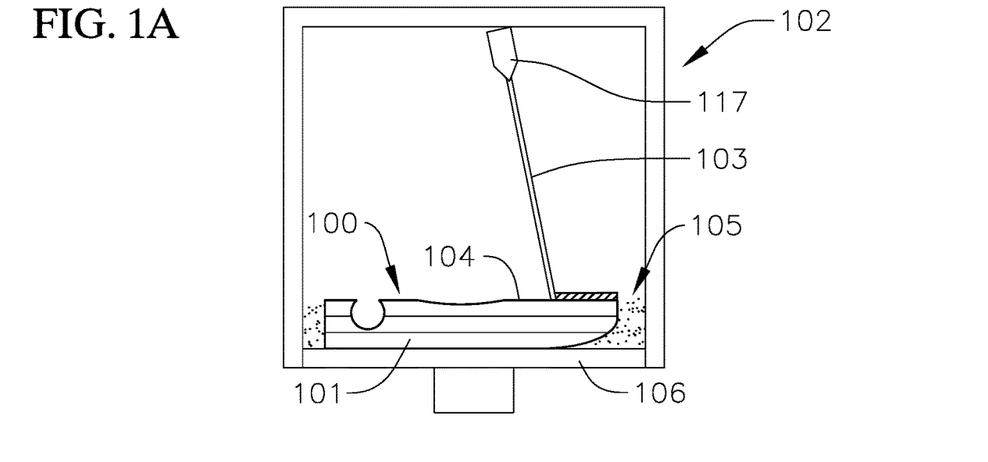
FIG. 1A illustrates a task of additively manufacturing at least one layer of a part with an additive manufacturing machine according to one embodiment of the present disclosure.
Figure 1B:
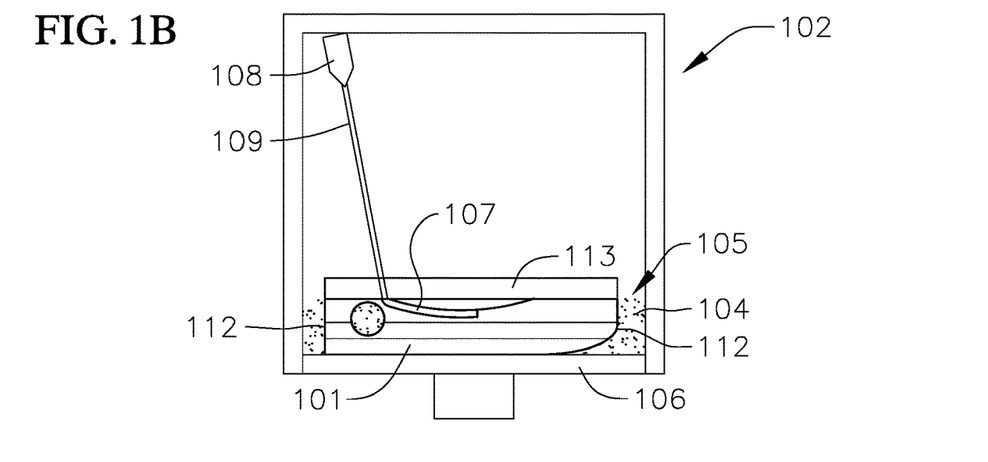
FIG. 1B illustrates a task of laser peening at least a region of one layer of the part prior to completion of the build of the part according to one embodiment of the present disclosure.
Figure 1C:
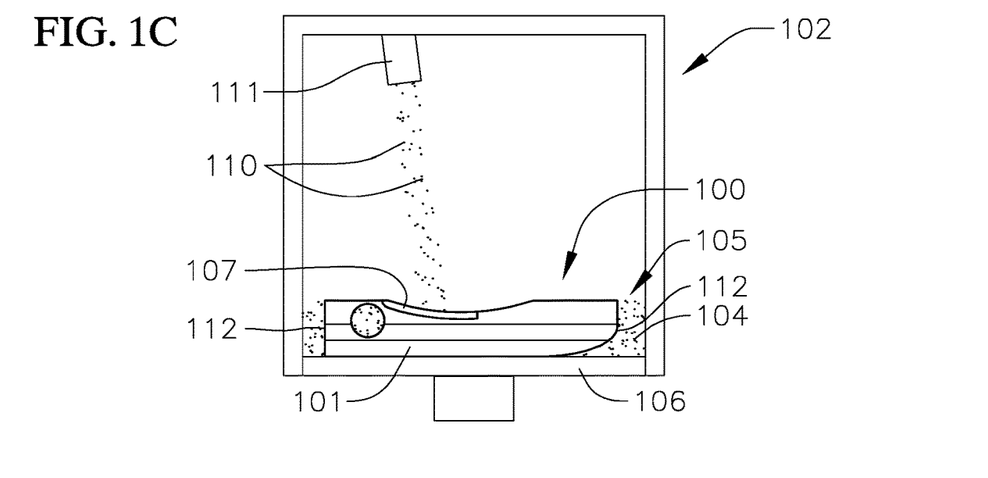
FIG. 1C illustrates a task of shot peening at least a region of one layer of the part prior to completion of the build of the part according to one embodiment of the present disclosure.
Figure 1D:
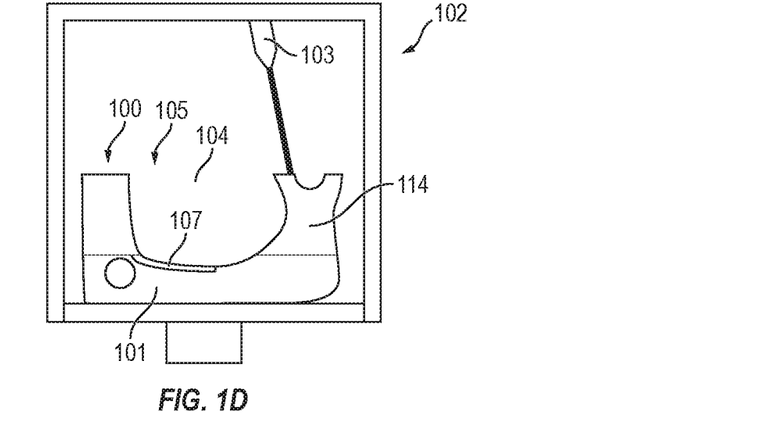
FIG. 1D illustrates a task of additively manufacturing at least one additional layer of the part with the additive manufacturing machine according to one embodiment of the present disclosure.
Figure 1E:
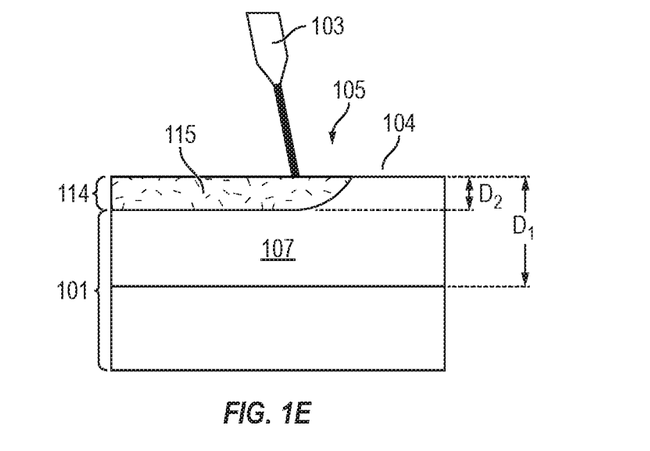
FIG. 1E is a detail view of the task of additively manufacturing the at least one additional layer of the part illustrated in FIG. 1D.
Figure 1F:
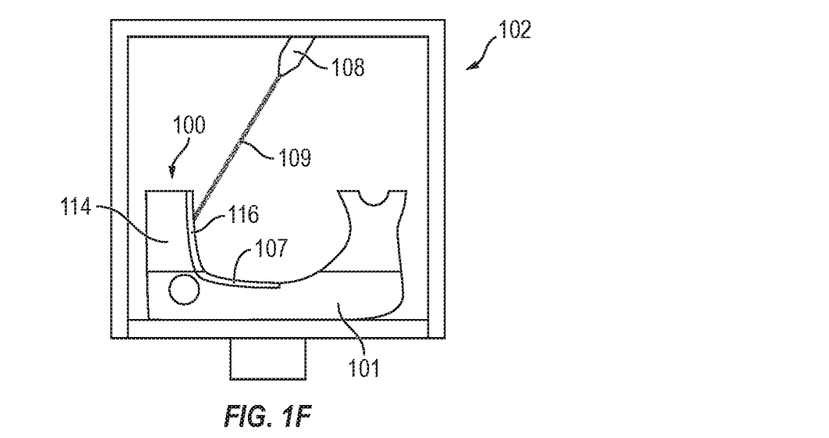
FIG. 1F illustrates a task of peening at least a region of the one or more additional layers of the part added during the task illustrated in FIGS. 1D-1E, prior to completion of the build of the part, according to one embodiment of the present disclosure.
Figure 1G:
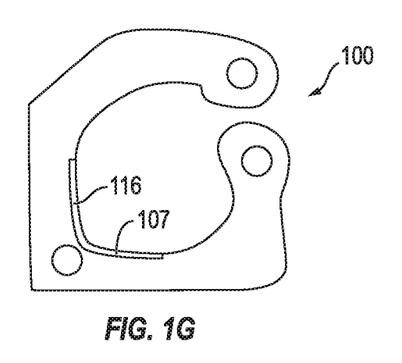
FIG. 1G illustrates a completed part formed according to one embodiment of the present disclosure, the completed part having a laser peened region for which no line of sight access exists.

With reference now to FIG. 1A, a method of manufacturing a part 100 (see FIG. 1G showing the completed part 100) according to one embodiment of the present disclosure includes a task of additively manufacturing at least one layer 101 of the part 100 with an additive manufacturing machine 102. The additive manufacturing machine 102 may be any suitable type or kind of additive manufacturing machine, such as an additive manufacturing machine that employs selective laser sintering, laser melting, scanned laser fusion and sintering, electron beam melting, selective inkjet binding, fused deposition modeling, or one or more combinations thereof. In the illustrated embodiment, the additive manufacturing machine 102 additively manufactures the one or more layers 101 of the part 100 utilizing a laser source 117 configured to emit a laser beam 103 that fuses, sinters, and/or melts and re-solidifies portions or regions of a powder feedstock (or powder) 104 (e.g., a metal powder feedstock and/or a metal alloy powder feedstock) in a powder bed 105. In the illustrated embodiment, the additive manufacturing machine 102 include a platform 106 (e.g., a base) on which the powder bed 105 is supported and on which the part 100 is formed.

With reference now to FIG. 1B, the method of manufacturing the part 100 also includes a task of peening at least a region 107 (e.g., a surface) of at least one of the layers 101 of the part 100, formed during the task illustrated in FIG. 1A, prior to completion of the build of the part 100. In the illustrated embodiment, the region 107 that is peened is a region of an uppermost one of the layers 101 (e.g., the task includes peening a region 107 of the most recently formed layer 101 of the part 100). In one or more embodiment, the peening task may be performed on exposed surfaces or regions of multiple layers (e.g., two or more layers) 101 of the part 100 prior to the completion of the build of the part 100. For instance, in the embodiment illustrated in FIG. 1B, the region 107 of the part 100 is a curved surface that exposes multiple layers of the part 101 and therefore the task of peening the region 107 peens multiple layers 101 of the part 100. Accordingly, in one or more embodiments, the task of peening the region 107 of the part 100 may peen more than one layer 101 deep in the part 100.

In one or more embodiments, the task of peening the region 107 of at least one of the layers 101 may include laser shock processing (i.e., laser peening) the region 107. Laser shock processing utilizes a peening laser 108 of a laser peening device that is configured to irradiate the region 107 of the part 100 with a laser beam 109. The laser beam 109 is configured to induce a shock wave in the region 107 of the part 100, and thereby mechanically work the region 107 of the part 100. The shock wave induced in the region 107 of the part 100 by the laser shock processing is configured to change the microstructure of the region 107, induce plastic deformation in the region 107, and create dislocations in the region 107 (e.g., crystallographic defects or irregularities in the region 107), which can increase hardness, reduce porosity, and induce compressive residual stress in the region 107 of the part 100 and thereby increase fatigue strength and stress corrosion resistance of the part 100 compared to a part that is not laser shock processed. The peening laser 108 may be any suitable type or kind of laser, such as a femtosecond pulsed laser or a nanosecond pulsed laser. The task of laser shock processing is also configured to alter the surface finish of the region 107 of the part 100 (e.g., the laser shock processing is configured to control the surface finish of the region 107 of the part 100).

The task of peening the region 107 of the part 100 may include any other suitable type or kind of peening process configured to induce in-situ plastic deformation in at least the region 107 of the part 100. For instance, in the embodiment illustrated in FIG. 1C, the peening process may include shot peening the region 107 of the part 100. During the shot peening process, shot 110 is directed at the region 107 of the part 100 from a nozzle 111 of a shot peening device, and the contact between the shot 110 and the region 107 plastically deforms the region 107 of the part 100. The plastic deformation of the region 107 of the part 100 during the shot peening process is configured to increase hardness, reduce porosity, and induce compressive residual stress in the region 107 of the part 100 and thereby increase fatigue strength and stress corrosion resistance of the part 100 compared to a part that is not peened. In one or more embodiments, the shot 110 utilized during the shot peening process may be readily removable following the shot peening process. In one or more embodiments, the shot 110 may include $CO_2$ particles and/or other suitable particles that are configured to readily sublime at a temperature and pressure inside the additive manufacturing machine 102. In one or more embodiments, the powder 104 in the powder bed 105 may be a non-ferrous metal and/or other suitable material not attracted or substantially not attracted to a magnetic field, and the shot 110 utilized in the shot peening process may be ferromagnetic metallic particles and/or other suitable particles attracted to a magnetic field such that the shot 110 can be separated (e.g., removed) from the powder 104 of the powder bed 105 following the shot peening process by exposing the shot 110 to a magnetic field.

In one or more embodiments, the peening process may be performed on the part 100 by orienting the peening laser 108 (FIG. 1B) of the laser peening machine, the nozzle 111 (FIG. 1C) of the shot peening machine, and/or other suitable peening device perpendicular or substantially perpendicular to the powder bed 105. In one or more embodiments, the peening process may be performed on the part 100 by orienting the peening laser 108 (FIG. 1B) of the laser peening machine, the nozzle 111 (FIG. 1C) of the shot peening machine, and/or other suitable peening device at a non-orthogonal angle relative to the powder bed 105 (e.g., the peening process may be performed on a side portion 112 of the one or more layers 101 of the part 100). In one or more embodiments, the partially completed part 100 may be raised (e.g., elevated) to expose more of a side portion 112 of the part 100 and then the peening process may be performed on one or more of the exposed side portions 112 of the part 100.

In one or more embodiments, the task of additively manufacturing at least one layer 101 of the part 100 (FIG. 1A) and the task of peening at least a region 107 of the part 100 (FIGS. 1B-1C) may be performed serially (e.g., the task of additively manufacturing at least one layer 101 of the part 100 may be performed and then the task of peening at least a region 107 of one of the layers 101 of the part 100 may be subsequently performed after the task of additively manufacturing the at least one layer 101). In one or more embodiment, the task of additively manufacturing at least one layer 101 of the part 100 and the task of peening at least a region 107 of one of the layers 101 of the part 100 may be performed concurrently, simultaneously, or substantially simultaneously (e.g., a region of one layer 101 of the part 100 may be additively manufactured while a different region of the same layer 101 is concurrently or substantially concurrently peened). Concurrently, simultaneously, or substantially simultaneously performing the additive manufacturing and peening tasks is configured to achieve faster processing of the part 100 compared to performing the additive manufacturing and peening tasks serially.

With reference again now to the embodiment illustrated in FIG. 1B, a confining medium 113 may be utilized during the task of laser peening the region 107 of the part 100. In one or more embodiments in which a confining medium 113 is utilized, the confining medium 113 is located between the part 100 and the peening laser 108 such that the laser beam 109 emitted from the peening laser 108 passes through the confining medium 113 before reaching the part 100. The confining medium 113 is configured to constrain and reflect the shock wave generated during the laser peening process back to the part 100 and thereby cause the shock wave to propagate through the part 100 or at least a region thereof. In one or more embodiments, the confining medium 113 is in contact (e.g., direct contact) with the region 107 of the part 100 that is being laser peened. In one or more embodiments, the confining medium 113 is partially transparent to the wavelength of the laser beam 109 emitted by the peening laser 108. Additionally, in one or more embodiments, the confining medium 113 may be additively applied to the region 107 of the part 100 that is to be laser peened. The additively applied material that is utilized as the confining medium 113 may be the same as or different than the material of the part 100. For instance, in one or more embodiments, a thin layer of the part 100 may be utilized as a confining medium 113 (e.g., the one or more layers 101 of the part 100 may be additively manufactured with a thickness exceeding the desired thickness of those one or more layers 101, and the excess thickness of these one or more layers 101 may be utilized as the confining medium 113). In one or more embodiments, the confining medium 113 conformally coats the part 100 in the region 107 being peened. In one or more embodiments, a selective inkjet binding process may be utilized to apply a thin layer of glass and/or quartz as the confining medium 113 on the region 107 of the part 100 to be laser peened. In one or more embodiments, the confining medium 113 may be a solid coating that was vapor deposited onto the region 107 of the part 100 that is to be laser peened. In one or more embodiments, the confining medium 113 may be a liquid. In one or more embodiments, the confining medium 113 may be a liquid that does not or substantially does not interfere, mechanically and/or chemically, with the powder bed 105 of the additive manufacturing machine. In one or more embodiments, the confining medium 113 may be a liquid that has a suitable high vapor pressure or such that the liquid is configured to suitably evaporate before a task, described below, of additively manufacturing one or more additional layers of the part 100 is performed. In one embodiment, the confining medium 113 is a liquid having a vapor pressure greater than 0.01 bar. In one embodiment, the confining medium 113 is a liquid having a vapor pressure greater than 0.1 bar.

In one or more embodiments, the task of laser peening the region of the part may be performed without the confining medium 113. In one or more embodiments in which the task of laser peening the region 107 of the part 100 is performed without the confining medium 113, the task of laser peening may impart thermal damage (e.g., thermal stresses) to the part 100 or a portion thereof (e.g., the region 107). In one or more embodiments, the method may include a task of annealing the part 100 or a portion thereof to correct the thermal damage imparted to the part 100 or a portion thereof. Additionally, in one or more embodiments, build parameters utilized during a subsequent task, described below, of additively manufacturing one or more additional layers of the part proximate to the laser peened region 107 of the part 100 may be selected to account for the thermal history of the laser peened region 107 and to control the amount and degree of stress relief and recrystallization of the part 100. For example, in one or more embodiments, the layer thickness of the additive process may be selected to be any suitable value in a range from approximately (about) 5 µm to approximately (about) 200 µm (e.g., from approximately (about) 25 µm to approximately (about) 50 µm). In one or more embodiments, the laser power may be selected to be any suitable value in a range from approximately (about) 50 W to approximately (about) 1000 W. In one or more embodiments, spot size may be selected to be any suitable value in a range from approximately (about) 25 µm to approximately (about) 500 µm (e.g., from approximately (about) 50 µm to approximately (about) 200 µm)). In one or more embodiments, the laser scan speed may be selected to be any suitable value in a range from approximately (about) 200 mm/s to approximately (about) 4,000 mm/s (e.g., from approximately (about) 500 mm/s to approximately (about)

2,500 mm/s). These build parameters may result in thermal gradients up to 10^7 K/m and local temperatures in excess of 3,000 K. In one or more embodiments, the built temperature may be selected to be any suitable value in a range from approximately (about) room temperature to approximately (about) 2,000 K or greater depending on the build set up. Furthermore, in one or more embodiments, the task of laser peening the region 107 of the part 100 may vaporize a small portion of the material in the region 107 of the part 100 (e.g., a femtosecond or nanosecond pulsed laser 108 utilized during the laser peening process may vaporize a portion of the region 107 of the part 100).

With reference now to FIG. 1D, the method of manufacturing the part according to one embodiment of the present disclosure includes a task of additively manufacturing at least one additional layer 114 of the part 100 with the additive manufacturing machine 102. The one or more additional layers 114 are formed on (e.g., directly on) at least a portion or a region of the one or more layers 101 that were formed during the task illustrated in FIG. 1A (e.g., the one or more additional layers 114 formed during the task illustrated in FIG. 1D are fused to the one or more previous layers 101, or at least a portion thereof, of the part 100). The one or more additionally layers 114 may be formed by the same or similar process as the one or more layers 101 formed during the task illustrated in FIG. 1A. In one or more embodiments, the task of additively manufacturing the one or more additional layers 114 may include applying a portion of the powder 104 (e.g., a metal powder feedstock and/or a metal alloy powder feedstock) from the powder bed 105 over the one or more layers 101 of the part 100 and then irradiating the powder 104 with the laser 103 to melt the powder 104 and fuse it to the one or more layers 101 of the part 100. In one or more embodiments, the one or more additional layers 114 of the part 100 may be formed on (e.g., directly on) the region 107 of the part 100 that was peened (e.g., laser shock peened and/or shot peened) during the task illustrated in FIG. 1B or FIG. 1C. In one or more embodiments in which the one or more additional layers 114 are formed on the region 107 of the part 100 that was peened, the peened region 107 will be in an internal region of the completed part 100 illustrated in FIG. 1G (e.g., the peened region 107 will be in a bulk portion of the part 100). In one or more embodiments in which the one or more additional layers 114 are not formed on the region 107 of the part 100 that was peened, the region 107 will be on an exterior portion of the completed part illustrated in FIG. 1G (e.g., the peened region 107 will be on an exterior surface of the completed part 100).

FIG. 1E illustrates a task of additively manufacturing the one or more additional layers 114 on (e.g., directly on) the region 107 of the part 100 that was peened (e.g., laser shock peened or shot peened). In the illustrated embodiment, the task of peening the region 107 of the part 100 induced plastic deformation in the part 100 to a depth $D_1$ (e.g., the region 107 has a depth $D_1$) and the task of additively manufacturing the one or more additional layers 114 on the peened region 107 of the part 100 induces a heat affected region 115 in the part 100 having a depth $D_2$. In the illustrated embodiment, the depth $D_2$ of the heat affected region 115 induced during the task of additively manufacturing the one or more additional layers 114 is less than the depth $D_1$ to which plastic deformation was induced in the part 100 during the task of peening the region 107 of the part 100. Accordingly, in the illustrated embodiment, properties induced in the part 100 during the peening process are retained following the task of additively manufacturing the one or more additional layers 114 on the peened region 107 (e.g., residual plastic deformation in the peened region 107 remains in the part 100 following the task of additively manufacturing the one or more additional layers 114 on the peened region 107). Properties of the peening process and/or properties of the additive manufacturing process may be selected to ensure that the depth $D_1$ of the peened region 107 exceeds the depth $D_2$ of the heat affected region 115.

With reference now to the embodiment illustrated in FIG. 1F, the method of manufacturing the part 100 also includes a task of peening at least a region 116 (e.g., a surface) of at least one of the one or more additional layers 114 of the part 100, formed during the task illustrated in FIGS. 1D and 1E. The task of peening the region 116 of the one or more additional layers 114 of the part 100 may be performed by any suitable peening process, such as laser shock processing (e.g., laser peening with a peening laser 108, such as a femtosecond pulsed laser or a nanosecond pulsed laser) and/or shot peening (e.g., directing shot 110 at the region 116 of the part 100 from a nozzle 111 of a shot peening device, as illustrated in FIG. 1C). In one or more embodiments, the task of peening the region 116 of the one or more additional layers 114 may utilize the same peening process utilized during the task of peening the region 107 of the one or more layers 101 of the part 100, described above with reference to FIG. 1C. In one or more embodiments, the task of peening the region 116 of the one or more additional layers 114 may utilize a peening process different than the peening process utilized during the task of peening the region 107 of the one or more layers 101 of the part 100, described above with reference to FIG. 1C. Additionally, in one or more embodiments, the region 116 may be adjacent (e.g., directly adjacent) to the region 107 such that the peened regions 107, 116 together form a continuous peened region of the part 100. In one or more embodiments, the region 116 may be spaced apart from the region 107 (e.g., the peened regions 107, 116 may be discrete regions of the part 100).

In one or more embodiments, the method may include alternately performing the task of additively manufacturing one or more additional layers of the part 100, as illustrated in FIG. 1D, and the task of peening a region of one of the additional layers of the part 100, as illustrated in FIG. 1F, until the build of the part 100 is complete, as illustrated in FIG. 1G. In one or more embodiments, the task of peening a region of the part 100 may be performed after every task of additively manufacturing one or more additional layers of the part 100. In one or more embodiments, the task of peening a region of the part 100 may not be performed after every task of additively manufacturing one or more additional layers of the part 100. In one or more embodiments, the task of peening may be selectively performed on a particular region of the part depending, for instance, on the geometry of the particular region (e.g., the complexity or simplicity of the geometry), the accessibility or inaccessibility of the particular region after completion of the build of the part 100, and/or the loads and stresses the part 100 is expected to experience in that particular region.

In the embodiment illustrated in FIG. 1G, the peened regions 107, 116 may be formed on portions (e.g., portions of exterior surfaces) of the completed part 100 for which no line of sight access exists. Accordingly, peening (e.g., laser shock peening or shot peening) the part or one or more portions thereof prior to completion of the part 100 enables controlling the surface finish, hardness, and/or residual stress of portions of the part 100 that could not be achieved following completion of the part 100 by related art post-processing techniques that require line of sight access.

Figure 2:
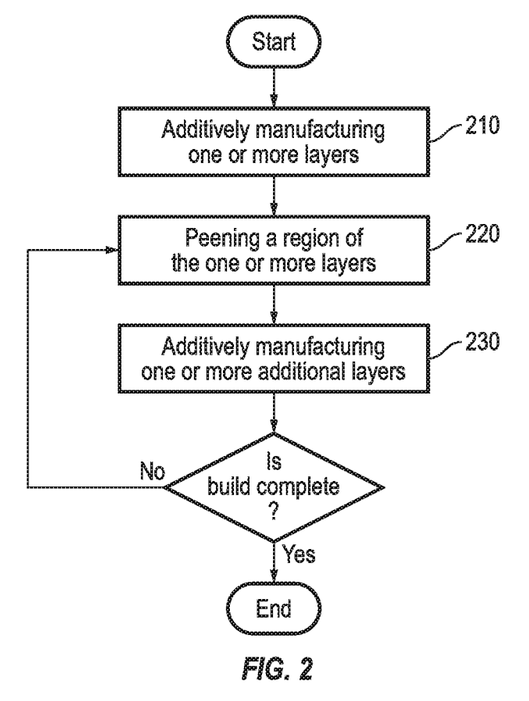
FIG. 2 is a flowchart illustrating tasks of additively manufacturing a part according to one embodiment of the present disclosure.

FIG. 2 is a flowchart illustrating tasks of a method 200 of manufacturing a part according to one embodiment of the present disclosure. In the illustrated embodiment, the method includes a task 210 of additively manufacturing at least one layer of the part. The task 210 of additively manufacturing at least a layer of the part may be performed by an additive manufacturing machine that employs selective laser sintering, laser melting, scanned laser fusion and sintering, electron beam melting, selective inkjet binding, fused deposition modeling, one or more combinations thereof, and/or any other suitable additive manufacturing process. The task 210 of additively manufacturing the one or more layers of the part may include utilizing a laser that fuses, sinters, and/or melts and re-solidifies portions or regions of a powder feedstock (e.g., a metal powder feedstock or a metal alloy powder feedstock) in a powder bed.

In the illustrated embodiment, the method also includes a task 220 of peening at least a region of the one or more layers, which were formed during the task 210 of additively manufacturing the one or more layers, prior to completion of the build of the part. The task 220 of peening the region of the one or more layers of the part may be performed by any suitable technique, such as laser shock processing (e.g., laser peening with a peening laser, such as a femtosecond pulsed laser or a nanosecond pulsed laser) and/or shot peening.

In one or more embodiments, the task 220 of peening at least a region of the one or more layers may include laser peening a region of the part through a confining medium that is at least partially transparent to the wavelength of the laser emitted by the peening laser. As described above, the confining medium is configured to constrain and reflect the shock wave generated during the task 220 of laser peening the part and thereby cause the shock wave to propagate through the part or at least a region thereof. The material of the confining medium may be the same as or different than the material of the part. In one or more embodiments, the confining medium may be a vapor deposited solid coating, a thin layer of glass or quartz applied by a selective inkjet binding process, a liquid that does not interfere, mechanically and/or chemically, with the powder bed of the additive manufacturing machine, and/or a liquid having a high vapor pressure that is configured to suitably evaporate following the task of laser peening the region of the part. In one or more embodiments, the task 220 of peening at least a region of the one or more layers may be performed without a confining medium. In one or more embodiments in which the task 220 of laser peening at least a region of the part is performed without a confining medium, the method may include a task of annealing the part (e.g., to correct thermal damage imparted to the part during the task 220 of laser peening the part).

In the illustrated embodiment, the method also includes a task 230 of additively manufacturing one or more additional layers of the part. The task 230 of additively manufacturing the one or more additional layers of the part may be performed by the same or similar process as the task 210 of forming the one or more layers of the part. In one or more embodiments, the task 230 of additively manufacturing the one or more additional layers of the part may be performed by a process different than the process utilized during the task 210 of forming the one or more layers of the part.

In the illustrated embodiment, the method ends if the build of the part is complete following the task 230 of additively manufacturing one or more additional layers of the part. If the build of the part is not complete following the task 230 of additively manufacturing one or more additional layers of the part, the method includes repeatedly performing the tasks 220, 230 of peening a region of the part and additively manufacturing one or more additional layers of the part until the build is complete. In one or more embodiments, the build of the part may end with the task 230 of additively manufacturing one or more additional layers of the part. In one or more embodiments, the build of the part may end with the task 220 of peening a region of the part. In one or more embodiments, the task 220 of peening a region of the part may not be performed after every task 230 of additively manufacturing one or more additional layers of the part. In one or more embodiments, the task 220 of peening may be selectively performed on a particular region of the part depending, for instance, on the geometry of the particular region (e.g., the complexity or simplicity of the geometry), the accessibility or inaccessibility of the particular region after completion of the build of the part, and/or the loads and stresses the part is expected to experience in that particular region.

Performing the task 220 of peening the part prior to completion of the part by the task 230 of additively manufacturing one or more additional layers of the part (e.g., peening the part throughout the additive manufacturing process) controls the surface finish, hardness, and/or residual stress throughout the part, including on interior surfaces of the part that would be difficult or impossible to access after the part is finished (e.g., peening the part during the additive manufacturing process enables controlling the surface finish, hardness, and/or residual stress of portions of the part for which no line of sight access exists following completion of the part). Controlling the surface finish, hardness, and/or residual stress of the part is configured to mitigate the potential for crack development in the part and thereby improve the fatigue life and stress corrosion resistance of the part.

In one or more embodiments, the plastic deformation induced in the part during the task 220 of peening (e.g., laser shock processing or shot peening) at least a region of the part is utilized to reduce the thickness of one or more regions of the part. In one or more embodiments, the task of peening one or more regions of the part may reduce the thickness of those one or more regions of the part below the resolution of the additive manufacturing process (e.g., the peening process is configured to produce components or regions of components having a thickness below the minimum thickness achievable by the additive manufacturing process of the additive manufacturing machine). In one or more embodiments, the method may include peening the part to achieve a thin, pinhole-free wall (e.g., a thin, non-porous wall) having a thickness below the minimum thickness limit of the additive manufacturing machine. For instance, in one or more embodiments in which the method includes additively manufacturing a heat exchanger, the method may include peening the part or a portion thereof to produce thin-walled fins of the heat exchanger having a thickness below the minimum thickness achievable by the additive manufacturing process of the additive manufacturing machine.

Figure 3:
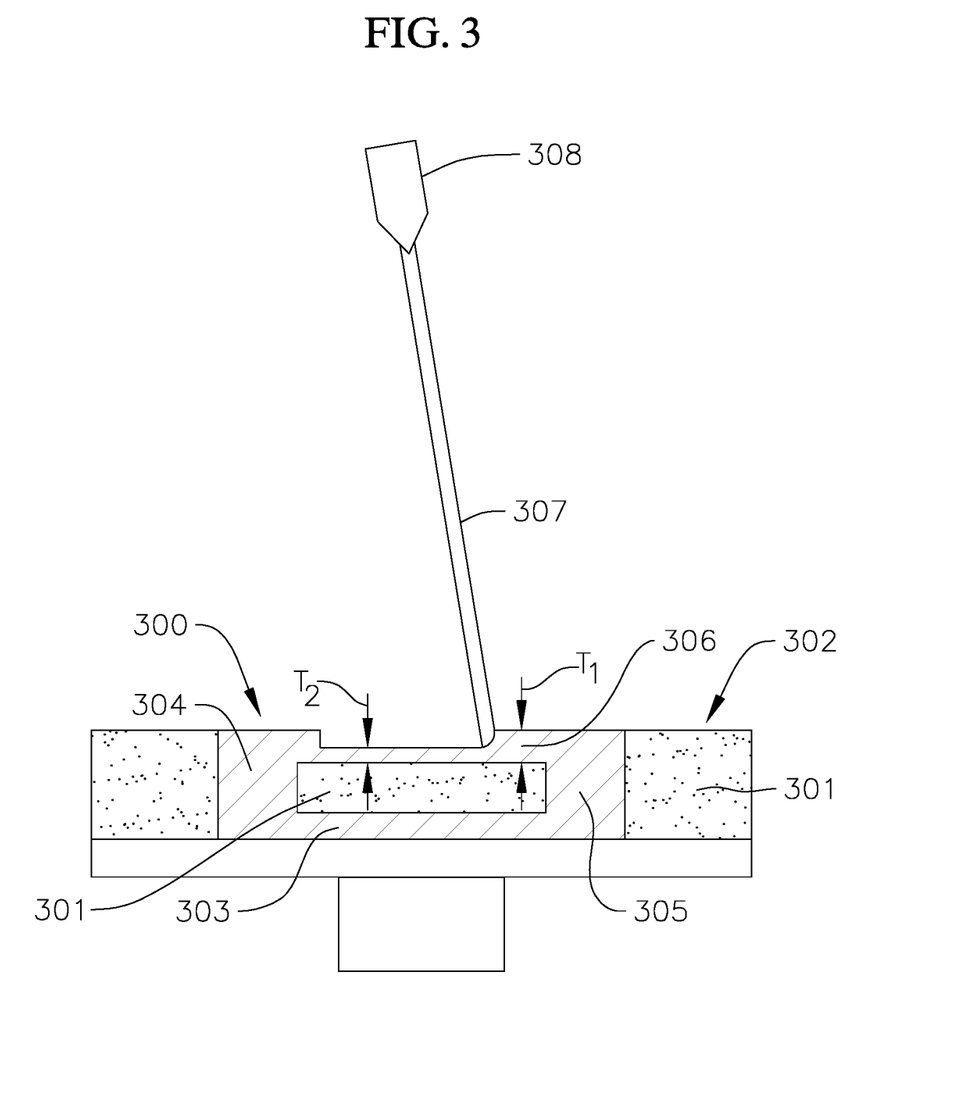
FIG. 3 illustrates a task of peening at least a region of a part to produce a thin wall of the part having a thickness below the minimum limit of an additive manufacturing process.

FIG. 3 depicts a part 300 according to one embodiment of the present disclosure. The part 300 may be formed by an additive manufacturing machine that employs selective laser sintering, laser melting, scanned laser fusion and sintering, electron beam melting, selective inkjet binding, fused deposition modeling, one or more combinations thereof, and/or any other suitable additive manufacturing process. Layers of the part 300 may be additively manufactured utilizing a laser that fuses, sinters, and/or melts and re-solidifies portions or regions of a powder feedstock 301 (e.g., a metal powder feedstock or a metal alloy powder feedstock) in a powder bed 302. In the illustrated embodiment, the part 300 includes a base wall 303, a pair of sidewalls 304, 305 extending upward from respective opposite ends of the base wall 303, and an upper wall 306 spaced above the base wall 303 and extending between upper ends of the sidewalls 304, 305. The sidewalls 304, 305 extend from the base wall 303 to the upper wall 306. In the illustrated embodiment, the upper wall 306 is supported (partially or fully) by the unsintered powder feedstock 301 (e.g., the upper wall 306 of the part 300 is at least partially supported by powder feedstock 301 that was not sintered during the process of additively manufacturing the part 300 from the powder feedstock 301). In one or more embodiments, the part 300 may have any other suitable configuration (e.g., the part 300 may be a heat exchanger including a series of cooling fins).

In the embodiment illustrated in FIG. 3, at least a portion of the upper wall 306 of the part 300 may be peened to reduce the thickness of the upper wall 306. In one or more embodiments, any other portion of the part 300 (e.g., one or more of the sidewalls 304, 305 or portions thereof) may be peened to reduce the thickness of that portion of the part 300. The upper wall 306 of the part 300 may be peened by any suitable technique. The peening process induces plastic deformation in the portion of the part 300 that is peened. In the illustrated embodiment, the upper wall 306 (or at least a portion thereof) of the part 300 is peened by laser shock processing (e.g., laser peening with a laser beam 307 emitted from a peening laser 308, such as a femtosecond pulsed laser or a nanosecond pulsed laser). Additionally, in one or more embodiments, the upper wall 306 may be laser peened by directing the laser beam 307 through a confining medium that is at least partially transparent to the wavelength of the laser beam 307 emitted by the peening laser 308. The confining medium may be the same as or similar to the confining medium 113 described above with reference to the embodiment illustrated in FIG. 1B. In one or more embodiments, the upper wall 306 (or at least a portion thereof) of the part 300 may be peened by shot peening (e.g., peening with shot emitted from a shot peening system). In one or more embodiments, the task of peening at least a portion of the upper wall 306 may be performed by a combination of laser peening and shot peening. The laser peening process may be the same as or similar to the laser peening process described above with reference to the embodiment illustrated in FIG. 1B, and the shot peening process may be the same as or similar to the shot peening process described above with reference to the embodiment illustrated in FIG. 1C.

In the illustrated, peening the upper wall 306 (or at least a portion thereof) of the part 300 reduces the thickness of the upper wall 306 (or the peened portion thereof) below the resolution of the additive manufacturing process that was utilized to manufacture the part 300 (e.g., peening the upper wall 306 reduces the thickness of the upper wall 306 to a thickness below the minimum thickness achievable by the additive manufacturing process of the additive manufacturing machine that was utilized to manufacture the upper wall 306). In the illustrated embodiment, the upper wall 306 has a thickness $T_1$ prior to the peening process (e.g., a minimum thickness of the additive manufacturing process utilized to form the upper wall 306) and the upper wall 306 (or at least a peened portion thereof) has a thickness $T_2$ less than the thickness $T_1$ after the peening process. In one or more embodiments, the thickness $T_2$ of the upper wall 306 (or at least a peened portion thereof) is less than the minimum thickness achievable by the additive manufacturing process utilized to form the upper wall 306). In one or more embodiments, following the task of peening the upper wall 306 or at least a portion thereof, the upper wall 306 is a thin, pinhole-free wall (e.g., a thin, non-porous wall) having a thickness $T_2$ below the minimum thickness limit of the additive manufacturing machine utilized to form the upper wall 306. In one or more embodiments, the thickness $T_2$ of the upper wall 306 after the peening process may be in a range from approximately (about) 0.1% to approximately (about) 50% less than the thickness $T_1$ of the upper wall 306 prior to the peening process (i.e., the thickness $T_2$ of the upper wall 306 after the peening process may be in a range from approximately (about) 50% to approximately (about) 99.9% of the thickness $T_1$ of the upper wall 306 prior to the peening process). Additionally, in one or more embodiments, the task of peening the upper wall 306 may remove up to an entire additively manufactured layer of the part or a portion thereof. For example, in one or more embodiments, the task of peening the upper wall 306 may reduce the thickness of the upper wall 306 (or at least a portion thereof) by up to approximately (about) 25 µm.

While certain embodiments of the present invention have been illustrated and described, it is understood by those of ordinary skill in the art that certain modifications and changes can be made to the described embodiments without departing from the spirit and scope of the present invention as defined by the following claims, and equivalents thereof. Although relative terms such as "above," "below," "inner," "outer," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or components may also be present therebetween. Moreover, when a component is referred to as being "coupled" to another component, it can be directly attached to the other component or intervening components may be present therebetween.

What is claimed is:

1. A method of manufacturing a part, the method comprising:

additively manufacturing, with an additive manufacturing machine, at least one wall of the part from powder in a powder bed, the wall having a first thickness; and peening, with a peening system, at least a portion of the wall of the part, the peening inducing plastic deformation in the at least a portion of the wall, wherein the at least a portion of the wall has a second thickness less than the first thickness following the peening, wherein the second thickness of the at least a portion of the wall is less than a minimum thickness limit achievable by the additive manufacturing machine, wherein the peening comprises shot peening at least a portion of the wall with shot from a shot peening system, and wherein the shot comprises $CO_2$ particles.

2. A method of manufacturing a part, the method comprising:

additively manufacturing, with an additive manufacturing machine, at least one wall of the part from powder in a powder bed, the wall having a first thickness; and peening, with a peening system, at least a portion of the wall of the part, the peening inducing plastic deformation in the at least a portion of the wall, wherein the at least a portion of the wall has a second thickness less than the first thickness following the peening, wherein the second thickness of the at least a portion of the wall is less than a minimum thickness limit achievable by the additive manufacturing machine, wherein the peening comprises shot peening at least a portion of the wall with shot from a shot peening system, and wherein the shot comprises ferromagnetic metallic particles.

3. A method of manufacturing a part, the method comprising:

additively manufacturing, with an additive manufacturing machine, at least one wall of the part from powder in a powder bed, the at least one wall having a first thickness; and peening, with a peening system, the at least one wall of the part, the peening inducing plastic deformation in the at least one wall at the location, wherein the at least one wall at the location has a second thickness less than the first thickness following the peening, wherein the peening comprises shot peening the at least one wall with shot from a shot peening system, and wherein the shot sublimes following the peening of the at least one wall.

4. The method of claim 3, wherein the powder comprises metal or a metal composite.

5. The method of claim 3, wherein the additively manufacturing and the peening are alternately and repeatedly performed.

6. The method of claim 3, wherein the at least one wall of the part comprises a base wall, an upper wall at least partially supported on an unsintered portion of the powder, and at least one sidewall extending from the base wall to the upper wall.

7. The method of claim 6, wherein the peening, with the peening system, of the at least one wall comprises peening, with the peening system, the upper wall.

8. The method of claim 3, further comprising annealing the part.

* * * * *